(12) United States Patent
Pohl et al.

(10) Patent No.: US 9,283,494 B2
(45) Date of Patent: Mar. 15, 2016

(54) AGGLOMERATED ION EXCHANGE PARTICLE BED AND METHOD

(75) Inventors: Christopher A. Pohl, Union City, CA (US); Charanjit Saini, Fremont, CA (US)

(73) Assignee: DIONEX CORPORATION, Sunnyvale, CA (US)

( * ) Notice: Subject to any disclaimer, the term of this patent is extended or adjusted under 35 U.S.C. 154(b) by 2933 days.

(21) Appl. No.: 11/229,057

(22) Filed: Sep. 16, 2005

(65) Prior Publication Data
US 2007/0062854 A1    Mar. 22, 2007

(51) Int. Cl.
*B01D 15/36*    (2006.01)
*B01J 20/32*    (2006.01)
*B01J 39/26*    (2006.01)
*B01J 41/20*    (2006.01)
*B01J 47/00*    (2006.01)

(52) U.S. Cl.
CPC .......... *B01D 15/361* (2013.01); *B01J 20/3221* (2013.01); *B01J 39/26* (2013.01); *B01J 41/20* (2013.01); *B01J 47/006* (2013.01)

(58) Field of Classification Search
CPC .... B01D 15/361; B01J 20/3221; B01J 39/26; B01J 47/20; B01J 47/006
USPC .............. 210/198.2, 686, 635, 656, 502.1
See application file for complete search history.

(56) References Cited

U.S. PATENT DOCUMENTS

| | | | |
|---|---|---|---|
| 2,961,417 A | 11/1960 | Small et al. | |
| 3,168,486 A | 2/1965 | Small | |
| 4,101,460 A | 7/1978 | Small | |
| 4,119,580 A | 10/1978 | Smith | |
| 4,252,644 A | 2/1981 | Small et al. | |
| 4,347,328 A | 8/1982 | Harmon et al. | |
| 4,351,909 A | 9/1982 | Stevens | |
| 4,376,047 A | 3/1983 | Pohl | |
| 4,383,047 A | 5/1983 | Stevens et al. | |
| 4,927,539 A | 5/1990 | Stevens et al. | |
| 5,024,767 A * | 6/1991 | Kubo et al. ............ | 210/682 |
| 5,324,752 A | 6/1994 | Barretto et al. | |
| 5,334,310 A | 8/1994 | Frechet et al. | |
| 5,453,185 A | 9/1995 | Frechet et al. | |
| 5,532,279 A | 7/1996 | Barretto et al. | |
| 5,728,457 A | 3/1998 | Frechet et al. | |
| 5,929,214 A | 7/1999 | Peters et al. | |
| 6,060,526 A | 5/2000 | Tasaki | |
| 6,074,541 A | 6/2000 | Srinivasan | |
| 6,207,098 B1 | 3/2001 | Nakanishi et al. | |
| 6,248,798 B1 | 6/2001 | Slingsby et al. | |
| 6,531,060 B1 | 3/2003 | Nakanishi et al. | |
| 6,749,749 B2 | 6/2004 | Xie et al. | |
| 6,867,295 B2 | 3/2005 | Woodruff et al. | |
| 2005/0181224 A1 | 8/2005 | Pohl et al. | |

FOREIGN PATENT DOCUMENTS

| | | |
|---|---|---|
| EP | 1 241 083 A1 | 3/2003 |
| GB | 1 230 363 | 4/1971 |
| WO | WO 01/055713 A2 A3 | 8/2001 |
| WO | WO 2005/079984 A1 | 9/2005 |

OTHER PUBLICATIONS

Ding, M.-Y., et al., "Elution behaviour of anions and cations on a mixed-bed stationary phase of anion and cation exchange resins," *Chromatographia* 40(9-19):539-544 (May 1995).

Lu, X., et al., "Purification of egg lecithin with mixed-bed ion-exchange resins chromatography," *Ion Exch. Adsorp.* 21(1):62-67 (Feb. 2005).

Pietrzyk, D., et al., "Anion-cation separations on a mixed-bed ion-exchange col. with indirect photometric detection," *J. Chromatog.* 546(1-2):101-110 (1991).

* cited by examiner

*Primary Examiner* — Ernest G Therkorn
(74) *Attorney, Agent, or Firm* — David J. Brezner

(57) ABSTRACT

A liquid chromatography agglomerated bed comprising component A comprising (a) substrate particles and polymer chains (e.g. a condensation polymer) bound to the substrate particles and projecting therefrom, and (b) component B comprising substrate particles having external surfaces of opposite charge to that of the charged polymer chains, components A and B being bound at least in part by electrostatic forces between the component A charged polymer chains and the component B external surfaces to form in composite an agglomerated bed of ion exchange particles packed in a chromatography column.

11 Claims, No Drawings

AGGLOMERATED ION EXCHANGE PARTICLE BED AND METHOD

BACKGROUND OF THE INVENTION

The invention relates to improved chromatography medium

Conventional chromatography media is based on spherical particles which can be either porous (mesoporous) or nonporous. These particles are normally packed in a column body in such a way as to produce maximum particle density. The particle density for such columns should be high in order to avoid the presence of random voids within the column bed which exhibit a detrimental effect on both chromatographic efficiency and physical stability of the packed column. Columns produced in this manner provide good chromatographic performance and good physical stability. From a theoretical point of view, chromatographic media packed in this manner approximate a dense assembly of spheres arranged in a cubic close pack geometry. Assuming the spheres are of uniform diameter, columns packed in a cubic close pack geometry will exhibit excellent physical stability and nearly theoretical chromatographic performance.

One problem with this packing geometry is that it imposes serious constraints on operating pressure when using high-performance stationary phases. Chromatographic efficiency is inversely proportional to particle diameter so in order to achieve improved chromatographic performance, this can only be achieved by using small diameter particles. Pressure for a column packed with spheres in a cubic close pack geometry is related to the operating flow rate, column diameter, column length, operating temperature, mobile phase viscosity and particle diameter. Column pressure is inversely proportional to the square of the particle diameter. For that reason, reduction in particle size when using conventional packed column based on particulate chromatographic media results in a geometric increasing pressure while yielding only a linear increase in chromatographic performance. For example, reducing the particle diameter by a factor of two should theoretically double the chromatographic performance of the column but the column pressure will increase by a factor of four.

The history of evolution of chromatographic materials in modern HPLC and ion chromatography has included a progressive decrease in the particle diameter in order to provide improved performance chromatographic materials. Now, however, the particle diameter has reached the point where significant improvements require dramatic increases in equipment costs along with significant reductions in instrument reliability and ease-of-use in order to deal with further pressure increases.

Furthermore, use of small particle size chromatographic media is often combined with reduction in column length in order to minimize the associated increase in pressure. Unfortunately, chromatographic performance is directly proportional to column length. Accordingly, improvements in chromatographic performance had been minimal as improved chromatographic efficiency in terms of plates per meter when using smaller diameter particle size chromatographic media is largely offset by reductions in column length resulting in similar chromatographic performance in terms of plates per column. While short columns with small diameter particle size chromatographic media make possible rapid separations for applications where high resolution is not a critical requirement, many chromatographic separations require improvements in terms of chromatographic performance. This can only be achieved by increasing column length or by reducing particle diameter while maintaining constant column length.

One technology which has been employed in order to address the above problems is the preparation of monolithic materials. A monolithic material is a chromatographic material composed of a continuous chromatographic medium with a series of through pores providing a means of fluid flow through the porous structure. Such a structure provides a significant potential advantage over particulate chromatographic media because it is theoretically possible to independently control the size of the through pores and the volume fraction of the stationary phase. Such materials have been prepared in a wide variety of shapes and sizes from a wide variety of materials. Surface area of such materials is controlled to the introduction of secondary mesopores in addition to the macropores which provide the fluid flow path through the monolithic material. Because the control of the pore size is independent of the effective size of the stationary phase segments, porosity and column pressure can be controlled independently of chromatographic performance.

There are several significant issues with this technology. First, preparation of materials of suitable chromatographic performance, operating pressure and physical stability require considerable experimentation. Furthermore, optimization is highly material dependent and so relatively minor changes in media composition require reoptimization of the entire preparation protocol. For this reason, development of new chromatographic media represents a major development project. This contrasts substantially with the situation with conventional particulate chromatographic media where a given particle platform can easily be modified to provide a wide variety of chromatographic media with minimal development effort.

An even more serious drawback to monolithic chromatographic media is the problem of shrinkage. Preparation of monolithic materials generally involves filling a cylindrical housing with the materials necessary for preparation of the monolith. After allowing the monolith to form (either through polymerization of monomers or condensation of inorganic precursors) a cylindrical porous monolithic rod is produced. The problem associated with this preparation process is that the resulting rod is smaller then the cylindrical housing in which it was produced. This presents a serious obstacle to the preparation of high performance chromatographic media. If the monolith is left in the housing in which it was initially prepared, fluid will preferentially flow around the monolith rather than flowing through it since the pressure drop for fluid flowing in the gap between the monolith and the cylindrical housing is significantly lower than the pressure drop for fluid flow through the monolith.

Mixed-bed columns packed with a bed comprising a mixture of strong anion and cation exchange resin have been used for liquid chromatography. The literature teaches that the cation and anion exchange resins form agglomerates or clumps which are undesirable because of poor flow distribution of liquid through the bed, e.g., channeling, which is taught to lead to low utilization of the resin's ion exchange capacity and a generally inefficient ion exchange operation. Various techniques have been suggested to avoid the perceived undesirable agglomeration. (U.S. Pat. Nos. 4,347,328 and 3,168,485 and European Patent Application EP1,241,083 A1.)

There is a need to overcome the weaknesses of both conventional particulate chromatographic media and conventional monolithic materials.

SUMMARY OF THE INVENTION

One embodiment of the present invention comprises (a) component A comprising substrate particles and polymer chains of one charge, positive or negative, bound to the substrate particles and projecting therefrom, and (b) component B comprising substrate particles having external surfaces of opposite charge to that of the charged polymer chains, at least some of the component A and component B being bound at least in part by electrostatic forces between the component A charged polymer chains and the component B external surfaces. The mixture preferably is subsequently packed onto a chromatography column forming, in composite, an agglomerated bed of ion exchange particles.

Another embodiment of the present invention comprises a method for making an agglomerated bed comprising ion exchange particles, the bed being suitable for use as chromatographic packing and comprising: mixing component A comprising substrate particles and polymer chains of one charge, positive or negative, bound to the substrate particles and projecting therefrom, with component B comprising substrate particles, having external surfaces of opposite charge to that of the charged polymer chains, to bind at least some of the component A and component B at least in part by electrostatic forces between the component A charged polymer chains and the component B external surfaces, thereby forming in composite an agglomerated bed of ion exchange particles, preferably by packing into a chromatography column.

DETAILED DESCRIPTION OF THE PREFERRED EMBODIMENTS

In general, the invention relates to a bed comprising agglomerated ion exchange particles and suitable for use in liquid chromatography packing. The bed includes a component A comprising substrate particles and polymer chains of one charge, positive or negative bound to the substrate particles, preferably projecting therefrom. Component A is mixed with component B comprising substrate particles having external surfaces of opposite charge to that of the charged polymer chains. At least some of component A and component B are bound at least in part by electric static forces between the component A charged polymer chains in the component B external surfaces. This mixture preferably is subsequently packed into column hardware such that an agglomerated bed of ion exchange particles is formed.

As used herein, the term "agglomerated bed" means a particulate bed including agglomerates of oppositely charged particles retained at least in part by electrostatic forces. Some individual particles in the bed may not be agglomerated. For the agglomerates, the number of particles per agglomerate may vary greatly, e.g., as few as 2 particles per agglomerate to 5 or 10 or 20 or 50 or 100 or more particles per agglomerate. The individual particles which are agglomerated may be of the same size as the conventional beads of a chromatography resin, e.g., from 0.5 to 1000 microns in diameter, preferably from 1 to 10 microns, and more preferably from 2 to 8 microns. The term agglomerated bed includes one formed in a prior reaction chamber for subsequent packing into a chromatography column and the bed as it exists in a chromatography column. The term excludes agglomerates formed solely by finely divided charged latex particles coating substrate ion exchange particles.

The polymer chains are bound to component A. They are suitably organic polymers of a length of from about 5 to 25 carbon atoms in the chain or more. As will be described hereinafter, the polymer chain may be formed by grafting in situ onto the substrate particles or may be bound to the support particles as preformed polymers. The polymer chains preferably project from component A as the result of the chains being of one charge, positive or negative, resulting in repulsion of any individual chains from adjacent chains. The chains may be straight, uncross-linked chains or cross-linked.

The polymer chains bound to, and which can extend from, at least the component A substrate particles can be chosen from a wide variety of different polymeric materials as is well-known to those skilled in the art. Suitable cationic polymer materials can include: grafted polymers as described in U.S. Patent Application Publication No. US 2005/0181224 A1, published Aug. 18, 2005, entitled "Coated Ion Exchange Substrate and Method of Forming" incorporated herein by reference. Additional polymeric materials can also include, but are not limited to, polymers derived from polyvinylbenzylchloride, polyglycidylmethacrylate, polyvinylbenzylglycidylether, polymers of epichlohydrin as well as any other polymer containing reactive substituents suitable for incorporation of either weakly basic or strongly basic substituents. Reagents suitable for incorporation of either weakly basic or strongly basic substituents include but are not limited to: ammonia, primary amines, secondary amines and tertiary amines as well as compounds containing mixtures of such substituents. Such polymers can be preformed and attached to the resin surface and then reacted with any of the reagents described above or such polymers may be preformed and reacted with any of the reagents described above and then attached to the resin surface. Alternatively, such polymers may be formed in situ on the resin surface and then reacted with any of the reagents described above or the monomer may be reacted with any of the reagents described above and then reacted with the resin surface to produce cationic polymers extending from the resin surface. Such polymers may be attached covalently to the resin surface or they may be attached electrostatically to the resin surface using methods well-known to those skilled in the art. Many other cationic polymers may also be used for this purpose as is well-known to those skilled in the art. Likewise, analogous anionic polymers may also be applied to the resin surface. Such anionic polymers may be attached in the form of preformed anionic polymers or neutral polymers subsequently converted to anionic polymers after the attachment process. Alternatively, neutral monomers or anionic monomers may be attached to the resin surface as part of the polymerization process. This attachment may either be covalent or electrostatic. Suitable anionic polymers include polymers containing carboxylic acid functional groups, sulfonic acid functional groups, phosphonic acid functional groups or phenolic functional groups as well as combinations of such functional groups as well as any other functionalities suitable for exhibiting anionic character under conditioned suitable for preparation of particle aggregates. (Encyclopedia of Polymer Science and Engineering, 2nd ed., John Wiley & Sons, New York, Vol. 11, pages 489-507 and Vol. 17, pages 759-770)

Component B comprises substrate particles with external surfaces of opposite charge to that of the charged polymer chains. As used herein, the term "external surfaces" can take many forms. For example, the surfaces may be in the form of charged substrate particles. Alternatively, the substrate particles can be of a neutral or opposite charge to that of the selected external surface charge which, in turn, is chemically treated to provide the desired charge opposite to that of the component A polymer chains. Further, the external surfaces could be charged polymer chains similar to those of component A but of opposite charge. In addition, the external surfaces could comprise layers of finely divided latex particles on substrates which can be bound electrostatically, e.g., as set forth in U.S. Pat. No. 4,101,465, or bound in some other manner such as by using an intermediate dispersant as illustrated in U.S. Pat. No. 5,532,279. The unifying feature is that the term "external surfaces" encompasses the surfaces of particles which can have a variety of charges or absence of charges in the interior or core of the substrate particles so long as the external or exposed surfaces, which can include finely divided latex particles or polymer chains, have a charge opposite of that the component A polymer chains.

The substrate particles may be relatively non-porous or mesoporous as those terms are used in the field of liquid chromatography. For example, if the component A substrate particles are mesoporous, the component A particle chains project not only from the external perimeter of the substrate particles but also from the mesopores in the interior of the substrate particles The polymer chains may be grafted into the component A substrate particles. In one grafting embodiment, the grafting is formed in situ, i.e., the polymerization occurs on the surface of the substrate particles, such as condensation polymer reaction products. In another embodiment, the polymer chains are preformed and grafted onto the surface of the component A substrate particles, such as by free radical binding as illustrated in U.S. Pat. No. 6,074,541.

Suitable substrate particles are those ion exchange resin particles used for conventional ion chromatography. Alternatively, substrate particles cam comprise organic or inorganic substrates and neutral or charged substrates.

Agglomeration by electrostatic interaction between oppositely charged particles can be performed according to the principles of conventional latex coatings onto substrate particles used for ion chromatography. Such techniques are disclosed in U.S. Pat. Nos. 4,351,909, 4,383,047, 4,252,644, 4,927,539, 4,376,047, 5,324,752, 5,532,279 and 5,248,798.

There are a number of differences of the present invention from the electrostatic coating onto substrate particles as set forth in the above patents. One feature of the present invention which distinguishes from such latex coated substrates relates to the relative particle size of the finely divided latex particles to the substrate particles of the prior art in comparison to the agglomerates of the present invention. It is preferable according to the present invention that the substrate particles of components A and B be relatively similar in size and preferably both be in the size range typically used for beads in chromatography beds. For example, it is preferable that the diameter of component A and component B vary by no more than about 100 to 400% or preferably less than 50 to 100% and most preferably less than 25 to 50%. Expressed differently, the agglomerates of the present invention should not form a coating of component A on component B or vice versa but instead be bound only in an interpenetrating polymer adhesion zone leaving a portion of both component A and component B unbound to each other by electrostatic forces or otherwise. In one preferred embodiment, the ratio of particle diameters of component A and component B is between 0.2:1 and 5:1. Suitable particles sizes for both components A and B are at least 0.5 to 1 microns preferably at least 1 micron and more preferable at least 2 microns and suitably in the ranges of 0.5 to 1000 microns. The bed typically includes agglomerates having a diameter of at least 1 microns, preferably at least 2 microns and ranges of 1 to 2000 microns, preferably 5 to 20 microns. The particles could be used for a conventional full scale chromatography columns, e.g., id of 1 to 25 mm or in capillary columns, e.g., id of 25 to 1000 microns.

Another difference from coated substrate particles is the presence of the polymer chains on at least the component A substrate particles. The component A polymer chains are particularly useful in promoting the formation of the aggregates of the present invention. It is believed that this is because the polymer chains, particularly when they project from the substrate surfaces, provide additional charge surface area for electrostatic binding of adjacent oppositely charged component B particles. It is believed that if the component B particles also have polymer chains of opposite charge, aggregation is even more efficient.

The agglomerates may be formed prior to packing the chromatography column and then deposited into the column. For example, components A and B may be premixed in a slurry of a carrier liquid, preferably an aqueous liquid such as deionized (DI) water in a chamber such as a column. After formation of the agglomerates, the slurry can be loaded into a chromatography column. Most of the agglomerates are sufficiently stable to remain intact during mixing and loading. The premixing can take place by flowing one of components A or B into a slurry of the other components coupled with further mixing, if desired. Alternatively, components A and B can be loaded into the chromatography column, preferably in aqueous liquid slurries, for mixing and formation of the agglomerates in the column. Alternatively, components A and B can be premixed as dry powders and subsequently mixed with a slurry solvent to allow spontaneous formation of agglomerates. Further, ionic strength plays a significant role in the magnitude of agglomerated formation both in terms of average size and range of sizes. Addition of an electrolyte to the slurry solvent can therefore be used to control the size and polydispersity of agglomerates formed. Another approach is to mixed together pastes of components A and B followed by dilution in a slurry solvent.

Columns packed with aggregate particles of the foregoing type produce a column bed with a pressure drop comparable to the effective diameter of the aggregates while producing chromatographic efficiencies comparable to that of individual particles from which the aggregates are made. Assuming the agglomerates are made prior to packing a chromatography column, the aggregates are preferably bound together with sufficient force so that a substantial number (e.g., at least 10% to 50%) or more of the aggregates remain intact after packing. The physical stability of the packing is enhanced by the adhesion between aggregates which contact each other during the packing process. Once the bed is packed the aggregated particle bed will retain the low pressure drop characteristic of a bed derived from aggregate particles while exhibiting superior chromatographic performance, equal to or better than the same particles packed in a conventional manner. Exposure of the column bed to high linear flow rates will not cause significant bed distortion or collapse of the expanded porous characteristic of the particle aggregates.

In one embodiment, components A and B are mixed together in any of a wide range of ratios. For example, from about 1% to a size 99% particles of component A can be mixed with 1 to 99% of component B substrate particles and produce improved useful chromatographic materials. One of the beneficial effects of the present invention is a reduction in column pressure. It has been found that even with a relatively low percentage of the oppositely charged particles column pressure is reduced to improve the ease of preparing stable columns with good chromatographic performances. It is preferable for the negatively and positively charged particles to approach about 1:1 for the most significant reductions in column pressure because that maximizes agglomeration. Thus, each of component A and component B preferably comprise at least 10%, 20%, 30% or 40% or more of the mixture of components A and component B. At close to a 1:1 ratio, column permeability is maximized which can result in a reduction in column pressure of 3-fold or more. Reduction in column pressure is dependent on the number of parameters including the diameter of the chromatographic particles or substrate particles for components A and B, the method of preparing the aggregate, the packing pressure applied during the packing process, the ionic strength of the slurry solvent and the presence of layers on the substrate particles.

In an embodiment in which component B includes no additional layers, the agglomerates can have a combination of anion exchange and cation exchange properties. During chromatography, anions and cations can be separated on a chromatography column with this type of packing. If desired, the agglomerates can be converted to a substantially single charge on the external surface of the agglomerates, and thus be used to separate anions or cations, but not both. For example, for a component A with anion exchange polymer chains, anion exchange latex particles can be electrostatically bound to the surface of component B particles after agglomeration with component A. In this way, the surface of the component B particles can be substantially completely layered with anion exchange particles so that the exterior surface of both component A and component B particles become totally anion exchange particles. The technique for binding the latex particles can be as described in the foregoing prior art patents. In this embodiment, suitably, the finely divided latex particles are sized as set forth in the patents, e.g., about 5 to 500 nm. A sufficient number of latex particles can be used to coat the exterior of the component B substrate particles as is known in the art.

The latex or colloidal particles may be used to coat either mesoporous or relatively non-porous substrate particles. For mesoporous particles, the latex coating preferably are of small enough size and a volume to coat both the interior and external surfaces of the mesoporous substrate particles. Alternatively, they can be sized to coat only the outside surface of the mesoporous substrate particles.

The presence of the charged polymer chains bound to at least the component A substrate particles are believed to facilitate the formation of stable aggregates by entangling the component B substrate particles of opposite charge. In the absence of charged polymer chains bound to at least the component A substrate particles, electrostatic adhesion between component A substrate particles and component B substrate particles is very weak since the attachment is limited to the point of contact between any two particles. When charged polymer chains are bound to at least the exterior surface of the component A substrate particles, the polymer chains, particular ones that extend from the substrate particles, on the surface of component A substrate particles along with the entanglement of these polymer chains in the surface of component B substrate particles allows for significantly greater adhesive strength. It is believed that this is due to a significantly larger effective contact area along with a large number of polymer strands linking the two particles together. Furthermore, the strength of these interactions in the case where neither component A or component B includes charged polymer chains bound to the exterior surface may be too weak to remain intact during the packing process so that the resulting agglomerate bed produced from such a mixture of particles does not exhibit the improved permeability characteristic of particle aggregate beds of the present invention.

It will be understood that other techniques may be used to enhance the stability of the agglomerate. For example, other layers may be added, e.g., by covalent attachment or otherwise.

In one embodiment, the component A polymer chains are formed by at least first and second condensation polymer reaction product of an amine and a poly functional compound. The first reaction product is attached to the component A substrate particles comprising the reaction product of an amine and a poly functional compound. Then, the second reaction product is bound to the first reaction product. A system of this type is described in U.S. Patent Application Publication No. US 2005/0181224 A1, incorporated herein by reference. This approach can form straight and cross-linked polymer chains of one charge projecting from the substrate particles.

A preferred condensation polymer system comprises an ion exchange coating is formed on a substrate for use in chromatographic applications. The method includes the steps of (a) reacting at least a first amine compound comprising amino groups selected from the group consisting of ammonia, a primary and a secondary amine, with at least a first polyfunctional compound, having at least two functional moieties reactive with said amino groups, in the presence of a substrate to form a first condensation polymer reaction product ("CPRP"), with an excess of either at least said first amine compound or first polyfunctional compound, irreversibly attached to said substrate, the first CPRP including first amine functional moieties, and (b) reacting at least a second amine compound, comprising amino groups selected from the group consisting of ammonia, a primary and a secondary amine, or at least a second polyfunctional compound with the excess first amine compound or first polyfunctional compound in the first condensation polymer reaction product to form a second CPRP. These steps will be referred to herein as step (a) and step (b), respectively.

In step (a), the first amine compound is reacted with a first polyfunctional compound, having at least two functional moieties reacted with said amino groups. The first amine compound and first polyfunctional compound are simultaneously reacted in the presence of a substrate to form the first CPRP irreversibly bound to the substrate. The reaction is performed to provide an excess of unreacted (and therefore reactive) first amine compound or first polyfunctional compound in the first CPRP. By "unreacted" is meant that one or more of the polyfunctional moieties of the amino groups or polyfunctional compounds is unreacted (and therefore reactive). This can be accomplished adjusting the molar ratio of reactants, the concentration of the reactants, the temperature of the reaction or the reaction time. The first CPRP of step (a) will be referred to as a "basement layer" because it attaches to the substrate.

If a molar excess of the polyfunctional compound or amine compound is used to provide the unreacted compound excess in the CPRP, the molar excess may vary over a wide range depending upon the characteristics desired to be imparted to the end product. Thus, for example, the excess expressed in terms of molar ratio of the reactants can be from as low as 0.2:1 to as high as 5:1 or more. Some of the factors used to choose the excess amount will be explained in more detail hereinafter.

The CPRPs are referred to herein as "layers" although each CPRP typically includes spaces or openings. As used herein, the terms CPRP or "condensation polymer reaction product" refer to a product in which the first amine compound reacts with the functional moieties of the polyfunctional compound to form a condensation polymer reaction product. The term "polymer" in this CPRP means a repeating organic chain, formed through the linkage of many identical smaller molecules in which chain growth occurs in a stepwise manner between multifunctional monomers.

The excess of the unreacted first amine compound or first polyfunctional compound enters into the reaction of step (b). There, at least a second amine compound or second polyfunctional compound is reacted with the excess unreacted amine compound or first polyfunctional compound in the first CPRP to form a second CPRP. For example, if the first amine compound is in excess in the first CPRP, then in step (b) a second polyfunctional reaction product is reacted with such excess unreacted first amine compound in step (a) to form a second CPRP. Conversely, if the first polyfunctional compound is in excess in the first CPRP, then in step (b), a second amine compound is reacted with the excess first polyfunctional compound to form the second CPRP.

The compounds used in step (a) may include the first amine compound as the only amine compound and the first polyfunctional compound as the only polyfunctional compound. Alternatively, it can include mixtures of the first amine compound with one or more additional amine compounds. Further, it can include the first polyfunctional compound alone with the first or additional amine compounds or may include a mixture of the first polyfunctional compound and one or more additional polyfunctional compounds. In this way, each condensation polymer reaction product may be tailored to include the desired functions.

Successive CPRPs may be formed after step (b) by repeating that step, alternating the excess of amine compound or polyfunctional compound so that in each successive layer the opposite of these two compounds is reacted with the excess in the prior layer to form an additional CPRP. For example, after step (b), a step (c) may be performed in which at least a third amine compound or third polyfunctional compound is reacted with the excess of the other compound in the second CPRP. Thus, the third amine compound or third polyfunctional compound is reacted with the excess one of the second amine compound or second polyfunctional compound in the second CPRP to form a third CPRP.

In another embodiment, in addition to attachment through electrostatic attraction to anionic surfaces, attachment can also be accomplished through the use of chemically modified substrates. For example, a conventional radical graft of a polymer substrate containing suitable graft sites on the surface can be accomplished using monomers containing primary, secondary or tertiary amine functionality. In this case, the condensation polymer will be directly covalently linked to the substrate surface. In addition, the surface of the substrate can be derivatized so as to introduce amino functionality. Subsequent exposure to the previously mentioned condensation polymer reagents will again produce a covalently linked condensation polymer surface graft.

Using the above method, a coated ion exchange substrate is formed in which the coating comprises at least a first and second CPRP. The first CPRP is irreversibly bound to the surface of the support substrate and comprises at least first amine compound of the foregoing type and at least a first polyfunctional compound with at least two functional moieties reactive with the amino groups of the first amine compound. A second CPRP is formed comprising the reaction product of the first amine compound or first polyfunctional compound with a second amine compound or second amine functional compound. This product encompasses at least the first and second CPRPs, in addition, a third or any subsequent CPRPs formed in sequential reaction with the second CPRP as described above. This produces the charged polymer chains of the present invention.

As set forth above, the reaction step (c) may be repeated any desired number of times. At any time in the above process, the outside layer of condensation polymer reaction products have the cation functionality of the amine groups. In one embodiment, the product of this reaction may be used directly in this form on component A without further modification. In this case, the product of this reaction will contain both strong base anion exchange sites and weak base anion exchange sites which can be advantageous for some separations. In another embodiment, strong base anion exchange sites may be introduced into the outside layer of the condensation polymer through a capping reaction by reacting with a capping compound comprising a tertiary amine group. In this manner, the reaction is capped or terminated and the ion exchange coating includes a greatly increased number of quaternary amines conventionally used for the separation of anions, as when the substrate is used in the form of anion exchange packing for a chromatography column or the like.

In another embodiment, the coated ion exchange substrate may be converted to a cation exchange substrate by reacting excess amine reactive functional groups on the exterior surface of the coated substrate with amine containing cation functional compounds to convert the substrate to a cation exchange substrate. As set forth above, in one preferred embodiment, the substrate comprises a plurality of substrates in the form of particles and the coated particles comprise ion exchange packing particles such as for chromatographic separations. Suitable amine containing cation functional groups include sulfonic acid, phosphonic acid and carboxylic acid or combinations thereof. Preferably, suitable amine containing cation functional compounds include two or more cation functional groups such that the total number of cation functional groups exceeds the number of previously formed anion exchange sites.

In another embodiment, the coated ion exchange substrate may be converted to a cation exchange substrate by reacting excess amine functional groups on the exterior surface of the coated substrate with cation functional compounds to convert the substrate to a cation exchange substrate. As set forth above, in one preferred embodiment, the substrate comprises a plurality of substrates in the form of particles and the coated particles comprise ion exchange packing particles such as for chromatographic separations.

In one embodiment, one or more of the condensation polymer functional groups is branched and/or cross-linked. For example, the second, third or higher CPRPs can be branched and cross-linked by appropriate choice of reagents and by choice of reagents and by adjustment of the ratios of reagents and excesses of one or the other of the amine compounds and polyfunctional compounds as set forth hereinafter.

The present invention provides many advantages over conventional columns. In comparison to porous monolithic materials, the particles can be packed into conventional chromatography column without derivatizing the column to avoid fluid flowing around the bed. It also utilizes commonly available chromatographic particulate media or beads for the preparation of medium exhibiting high performance characteristics typical of small particles while at the same time exhibiting permeability characteristics similar to larger particles. The resulting column can be used at significantly higher flow rates than conventional columns packed with the same materials in a conventional manner because the improved permeability of the agglomerated bed. Alternatively, the lower pressure drop of the aggregated monolith structures enables the use of significantly longer chromatography columns providing for substantial increases in plates per column and associated improvements in chromatographic resolving power.

The above invention has been described with respect to anion exchange polymer chains in component A and opposite charges on component B. It should be understood that the charges can be reversed.

To illustrate the present invention, the following non-limiting examples are provided.

Example 1

In one embodiment using a condensation reaction to form the projecting polymer chains, macroporous ethylvinylbenzene-divinylbenzene copolymer beads are first lightly surface-sulfonated in concentrate sulfuric acid at 80° C. for about one hour to introduce negative surface charges onto the substrate particles. The resulting particles are packed into conventional column hardware and coated with a condensation polymer formed in situ from the reaction of epoxy monomer with a primary amine (preferably, formed in situ from the reaction of epoxy monomer and a primary amine, preferably, butanediol diglycidyl ether and methyl amine). The column is treated with solutions of epoxy monomer followed by solutions of primary amine. The sequence of treatment is repeated to prepare suitable anion exchange phase or component A with substrate particles and polymer chains projecting therefrom. The column is then emptied, and the coated materials sonicated with a high wattage ultrasonic probe to break up particles which may have become bounded together during these reactions. This technique is used for forming component A.

The agglomerates are formed by making a slurry of such component A material in a suitable solvent, preferably deionized water, to produce a particle slurry. The second, separate slurry, e.g., a batch of surface sulfonated particles not exposed to the epoxy monomer and primary amine condensation product are added dropwise to the primary particle slurry (component A) while the slurry is stirred to provide the aggregated or agglomerated polymer particle. Such aggregated polymer particles are then packed into a column and used as is. The agglomerate of components A and B formed in this manner are then coated with a condensation polymer formed in situ from the reaction of epoxy monomer with a primary amine (of the same type as described above). The coating process is ended or the coating is treated with solutions of epoxy monomer followed by solutions of primary amine. The sequence can be repeated to form a suitable anion exchange phase. The coating provide a way of additionally agglomerating or gluing the resin particles together as well as increasing the ion exchange capacity of the aggregated bed.

Example 2

50 g of 7.3 micron resin particles prepared from a mixture of 55% divinylbenzene and 45% ethylvinylbenzene with 60% pore volume and a surface area of 22 $m^2$ per gram were slurried sufficient glacial acetic acid to make a thick paste to which 1000 g of sulfuric acid was slowly added. The resulting mixture was heated in a stirred reactor to 80° C. for 1 hour. The resulting lightly surface sulfonated particles were poured into can liters of deionized water while stirring. The resulting particle slurry was then filtered and washed with deionized water and stored as a damp cake for further use.

Example 3

4.58 g of the lightly surface sulfonated resin from above was slurried with 8.04 g of a solution composed of 932 g of water, 5 g of Igebal CO-630 (an ethoxylated alkylphenol nonionic surfactant), 50 g of acetic acid and 13 g of ethylene diamine. The resulting slurry was packed into a 4 mm by 250 mm column body at 8 ml per minute at a temperature of 65° C. for 15 minutes. The packed column was then removed from the column packing station and the top end fitting attached to the column body. Following this, the packed column was then placed in a 65° C. water bath while a mixture containing 7.2% (by weight) butanedioldiglycidylether and 1.12% methylamine (by weight) was pumped through the column for two hours at 0.25 ml per minute. Without interrupting the flow, a solution containing 10% (by weight) butanedioldiglycidylether was passed through the column for another 30 minutes. Following that, without interrupting the flow, a solution containing for % (by weight) methylamine was passed through the column for another 30 minutes. The column was then rinsed with deionized water for 15 minutes before being removed from the water bath. The column was unpacked, the particles exposed to a high wattage ultrasonic probe to detach any particles cemented together during the preceding process, the particles filtered and washed with deionized water and stored in the form of a damp cake. The particles thus formed comprise component A particles coated with cationic polymer extending from both the interior and exterior surface.

Example 4

A mixture was prepared using 0.53 g of the particles from Example 3 together with 2.99 g of a solution composed of 932 g of water, 5 g of Igebal CO-630 (an ethoxylated alkylphenol nonionic surfactant), 50 g of acetic acid and 13 g of ethylene diamine. Separately, 0.52 g of the particles from Example 2 were slurried with 2.09 g of the above mentioned slurry solution and mixed. Following this, the mixture of particles from example 2 were slowly added to the mixture of particles from example 3 while being vigorously stirred using a magnetic stirrer. The resulting mixture was then packed into a 2 mm by 250 mm column body at 2.5 ml per minute and 65° C. for 15 minutes. The column was then removed from the column packing adapter, the top end fitting installed in the packed column placed in a 65° C. water bath. Following this, the packed column was then placed in a 65° C. water bath while a mixture containing 7.2% (by weight) butanedioldiglycidylether and 1.12% methylamine (by weight) was pumped through the column for 30 minutes at 0.1 ml per minute. Without interrupting the flow, a solution containing 10% (by weight) butanedioldiglycidylether was passed through the column for another 30 minutes. Following that, without interrupting the flow, a solution containing 4% (by weight) methylamine was passed through the column for another 30 minutes. The last two steps were repeated for two additional reaction cycles for a total of 120 additional minutes. The column was then rinsed with deionized water for 15 minutes before being removed from the water bath. The resulting column was then placed on an ion chromatographic and evaluated for chromatographic performance. The column was of the exceptionally low-pressure for the particle size used to prepare the column (670 psi when operated at 0.25 ml per minute and 30° C. with 30 mM potassium hydroxide eluent). The column exhibited efficiency slightly better then average for particles of this size with an efficiency of 8600 plates for nitrate which had a retention time of 7.7 minutes.

Example 5

The column from example 4 was returned to the 65° C. water bath for addition of another layer of condensation polymer. A solution containing 10% (by weight) butanedioldiglycidylether was passed through the column for 30 minutes at 0.1 ml per minute. Following that, without interrupting the flow, a solution containing 4% (by weight) methylamine was passed through the column for another 30 minutes. The column was then rinsed with deionized water for 15 minutes before being removed from the water bath. The resulting column was then placed on an ion chromatographic and reevaluated for chromatographic performance. The column continued to exhibit exceptionally low-pressure (670 psi when operated at 0.25 ml per minute and 30° C. with 30 mM potassium hydroxide eluent). The column efficiency was essentially unaffected by the additional coating step (8560 plates for nitrate) but the retention time for nitrate increased to 11.7 minutes, indicating successful addition of another layer of condensation polymer. The column was then exposed to several days of chromatographic evaluation including testing at 0.75 ml per minute. After returning to the initial chromatographic conditions, the column was retested and found to exhibit chromatographic performance essentially unchanged from the original performance, demonstrating the physical stability of the column.

Example 6

A mixture was prepared using 0.68 g of the particles from example 3 together with 2.18 g of a solution composed of 932 g of water, 5 g of Igebal CO-630 (an ethoxylated alkylphenol nonionic surfactant), 50 g of acetic acid and 13 g of ethylene diamine. Separately, 0.68 g of the particles from example 2 were slurried with 2.01 g of the above mentioned slurry solution and mixed. Following this, the mixture of particles from example 2 were slowly added to the mixture of particles from example 3 while being vigorously stirred using a magnetic stirrer. The resulting mixture was then packed into a 2 mm by 250 mm column body at 2.5 ml per minute and 65° C. for 15 minutes. The column was then removed from the column packing adapter, the top end fitting installed in the packed column placed in a 65° C. water bath. Following this, the packed column was then placed in a 65° C. water bath while a solution containing 10% (by weight) butanedioldiglycidylether was passed through the column for 30 minutes at 0.2 ml per minute. Following that, without interrupting the flow, a solution containing 4% (by weight) methylamine was passed through the column for another 30 minutes. The last two steps were repeated for one additional reaction cycle for a total of 60 additional minutes. The column was then rinsed with deionized water for 15 minutes before being removed from the water bath. The resulting column was then placed on an ion chromatographic and evaluated for chromatographic performance. The column was of the exceptionally low-pressure for the particle size used to prepare the column (650 psi when operated at 0.25 ml per minute and 30° C. with 30 mM potassium hydroxide eluent). The column exhibited efficiency slightly better then average for particles of this size with an efficiency of 8630 plates for nitrate which had a retention time of 6.2 minutes. As is characteristic of materials prepared as described above, the resolution of sulfate and carbonate was minimal with this column under the conditions described above.

Example 7

The column from example 6 was then treated with a colloidal dispersion of cationic latex particles (the particles chosen can be used in the preparation of the IonPac AS11-HC column from Dionex Corporation), pumping the dispersion to the column at a flow rate of 0.1 ml per minute. Afterward, the column was rinsed with deionized water and 0.1 molar sodium hydroxide containing 25% acetonitrile. The resulting column was then placed on an ion chromatographic and reevaluated for chromatographic performance. The column remained exceptionally low-pressure for the particle size used to prepare the column (650 psi when operated at 0.25 ml per minute and 30° C. with 30 mM potassium hydroxide eluent). The column exhibited improved efficiency compared to evaluation before the latex coating step. Chromatographic efficiency for nitrate increased to 9800 plates while the retention time increased to 8.0 minutes, indicating the uptake of the cationic latex particles on the surface of the component B particles. The resolution of carbonate from sulfate had substantially improved after the latex coating process, as expected for a column containing both condensation cationic polymer and cationic latex particle stationary phase composition. The column was then exposed to a variety of different eluent conditions including operation at flow rates as high as 0.75 ml per minute without significant degradation in column performance when retested under the conditions described above.

Example 8

(Comparative example) 0.75 g of resin from Example 2 above was mixed with 0.75 g of 10 micron 15% cross-link particle size mesoporous anion exchange resin (the resin was used in the preparation of the CarboPac MA1 column from Dionex Corporation) and slurried in 6.0 g of a solution composed of 932 g of water, 5 g of Igebal CO-630 (an ethoxylated alkylphenol nonionic surfactant), 50 g of acetic acid and 13 g of ethylene diamine. The anion exchange resin was synthesized such that there was no cationic polymer projecting from the resin surface (i.e. this anion exchange resin was made in the conventional manner). This resin exhibited minimal evidence of aggregation. Four drops of this slurry were added to 10 ml of deionized water and examined under the microscope at 200 power. Significant numbers of aggregated particles were observed. Four drops of the same slurry were then added to 10 ml of the slurry solution described above. In this higher ionic strength medium nearly all the particle aggregates disappeared with less than 10% of the particles being present in the form of aggregates and nearly all of the aggregates were composed of only two particles. Clearly, in the absence of projecting ionic polymer, electrostatic aggregation was very weak being disrupted by ionic strength alone. Such weak aggregation was insufficient to produce physically stable aggregated bed columns.

Example 9

4.12 g of the 7.9 micron lightly surface sulfonated nonporous resin prepared as described in Example 2 was slurried with 8.22 g of a solution composed of 932 g of water, 5 g of Igebal CO-630 (an ethoxylated alkylphenol nonionic surfactant), 50 g of acetic acid and 13 g of ethylene diamine. The resulting slurry was packed into a 4 mm by 250 mm column body at 8 ml per minute at a temperature of 65° C. for 15 minutes. The packed column was then removed from the column packing station and the top end fitting attached to the column body. Following this, the packed column was then placed in a 65° C. water bath while a mixture containing 7.2% (by weight) butanedioldiglycidylether and 1.12% methylamine (by weight) was pumped through the column for two hours at 0.25 ml per minute. Without interrupting the flow, a solution containing 10% (by weight) butanedioldiglycidylether was passed through the column for another 30 minutes. Following that, without interrupting the flow, a solution containing for % (by weight) methylamine was passed through the column for another 30 minutes. The column was then rinsed with deionized water for 15 minutes before being removed from the water bath. The column was unpacked, the particles exposed to a high wattage ultrasonic probe to detach any particles cemented together during the preceding process, the particles filtered and washed with deionized water and stored in the form of a damp cake. The particles thus formed comprise component A particles coated with cationic polymer extending only from the exterior surface.

Example 10

0.75 g of resin from example 2 above was mixed with 0.75 g of resin from example 9 and slurried in 6.0 g of a solution composed of 932 g of water, 5 g of Igebal CO-630 (an ethoxylated alkylphenol nonionic surfactant), 50 g of acetic acid and 13 g of ethylene diamine. The anion exchange resin was synthesized such that cationic polymer projects from the resin surface. This resin exhibited substantial evidence of aggregation. Four drops of this slurry were added to 10 ml of deionized water and examined under the microscope at 200 power. Nearly all of the particles were present in the form of large extended aggregates. Four drops of the same slurry were then added to 10 ml of the slurry solution described above. In this higher ionic strength medium nearly all the particle aggregates remained but the aggregation number was significantly reduced. More than 90% of the particles being present in the form of aggregates and nearly all of the aggregates had aggregation numbers of greater than four. In the presence of projecting ionic polymer, electrostatic aggregation was much stronger with exposure to ionic strength alone being insufficient to break up particle aggregates. Such strong aggregation forces produce physically stable aggregated bed columns described in Examples 4-7.

What is claimed is:

1. An agglomerated particle bed comprising ion exchange particles, said bed being suitable for use as chromatographic packing and comprising:
   (a) component A comprising substrate particles and polymer chains of one charge, positive or negative, bound to said substrate particles, said component A polymer chains being formed by at least first and second condensation polymer reaction products of an amine and a polyfunctional compound, said first reaction product being attached to said component A substrate particles and comprising the reaction product of an amine and a polyfunctional compound, and said second reaction product being bound to said first reaction products, and
   (b) component B comprising substrate particles having external surfaces of opposite charge to that of said charged polymer chains, at least some of said component A and component B being bound at least in part by electrostatic forces between said component A charged polymer chains and said component B external surfaces forming, in composite, an agglomerated bed of ion exchange particles; the ratio of particle diameters of component A and component B being between 0.2:1 and 5:1.

2. The bed of claim 1 in which said component B charged external surfaces comprise charged polymer chains of opposite charge to said component A polymer chains.

3. The bed of claim 1 in which said component A substrate particles are macroporous and said component A polymer chains project from the macropores of said particles.

4. The bed of claim 1 in which said polymer chains project from the surface of said component A substrate particles.

5. The bed of claim 1 in which said component A substrate particles have substantially uncharged cores to which said component A polymer chains are affixed.

6. The bed of claim 1 further comprising component C substrate particles substantially smaller than said component A substrate or component B substrate particles, and of opposite charge to said component B external surfaces, said component C particles being bound to said component B external surfaces at least in part by electrostatic forces.

7. The bed of claim 1 in which said component B substrate particles are entangled in said projecting component A polymer chains.

8. The bed of claim 1 in which the ratio of said component A substrate to said component B substrate particles is from about 1 to 99 to from about 99 to 1.

9. The bed of claim 1 in which said bed is disposed in a chromatography column.

10. A method of liquid chromatography comprising separating ionic species in a liquid sample stream by flowing the stream in an eluent through the chromatography column of claim 9.

11. An agglomerated bed comprising ion exchange particles, said bed being suitable for use as chromatographic packing and comprising:
   (a) component A comprising substrate particles and polymer chains of one charge, positive or negative, bound to said substrate particles, said component A polymer chains being formed by at least first and second condensation polymer reaction products of an amine and a polyfunctional compound, said first reaction product being attached to said component A substrate particles and comprising the reaction product of an amine and a polyfunctional compound, and said second reaction product being bound to said first reaction products, and
   (b) component B comprising substrate particles having external surfaces of opposite charge to that of said charged polymer chains, at least some of said component A and component B being bound at least in part by electrostatic forces between said component A charged polymer chains and said component B external surfaces forming, in composite, an agglomerated bed of ion exchange particles; the diameters of component A and component B varying by no more than 400%.

* * * * *